United States Patent
Yhr

(10) Patent No.: US 11,932,250 B2
(45) Date of Patent: Mar. 19, 2024

(54) METHOD FOR CONTROLLING A VEHICLE COMBINATION

(71) Applicant: Volvo Truck Corporation, Gothenburg (SE)

(72) Inventor: Hamid Yhr, Gråbo (SE)

(73) Assignee: Volvo Truck Corporation, Gothenburg (SE)

( * ) Notice: Subject to any disclaimer, the term of this patent is extended or adjusted under 35 U.S.C. 154(b) by 268 days.

(21) Appl. No.: 17/522,027

(22) Filed: Nov. 9, 2021

(65) Prior Publication Data

US 2022/0169252 A1  Jun. 2, 2022

(30) Foreign Application Priority Data

Dec. 1, 2020 (EP) .................................. 20210939

(51) Int. Cl.
*B60W 30/18* (2012.01)
*B60L 58/12* (2019.01)
(Continued)

(52) U.S. Cl.
CPC ....... *B60W 30/18127* (2013.01); *B60L 58/12* (2019.02); *B60W 20/20* (2013.01);
(Continued)

(58) Field of Classification Search
CPC . B60W 30/18127; B60W 20/20; B60L 58/12; B60L 58/14; B60L 58/15;
(Continued)

(56) References Cited

U.S. PATENT DOCUMENTS 6,390,215 B1   5/2002 Kodama et al.
10,500,975 B1  12/2019 Healy
(Continued)

FOREIGN PATENT DOCUMENTS

DE   102012108769 A1   3/2014
DE   102015200458 A1   7/2015
(Continued)

OTHER PUBLICATIONS

Extended European Search Report for European Patent Application No. 20210939.3, dated May 26, 2021, 10 pages.
Examination Report for European Patent Application No. 20210939.3, dated Jan. 31, 2024, 7 pages.

*Primary Examiner* — Hai H Huynh
(74) *Attorney, Agent, or Firm* — Withrow & Terranova, PLLC

(57) ABSTRACT

The present disclosure relates to controlling transfer of electrical energy in a coupling between a first vehicle and a second vehicle of a vehicle combination, each of the first and second vehicles having an electric machine and an energy storage system, wherein at least the electric machine of the second vehicle is operable in a traction mode and a generator mode for generating electrical energy during a regenerative braking event of the second vehicle, the method comprising determining an amount of possible excessive energy from the braking event of the second vehicle, determining a total energy level of the second vehicle, determining a total energy level of the first vehicle, comparing the determined amount of possible excessive energy with the determined total energy levels of the first vehicle and second vehicle, and controlling direction of the transfer of electrical energy between the first and second vehicle based on the comparison.

12 Claims, 5 Drawing Sheets

(51) Int. Cl.
*B60W 20/20* (2016.01)
*H04L 12/40* (2006.01)

(52) U.S. Cl.
CPC .... *H04L 12/40* (2013.01); *H04L 2012/40215* (2013.01); *H04L 2012/40273* (2013.01)

(58) Field of Classification Search
CPC ...... B60L 15/38; B60L 53/57; B60L 2200/36; B60L 2200/28; B60L 7/10; B60L 2240/12; B60L 2240/14; B60L 2240/26; B60L 2240/527; B60L 2240/529; B60L 2240/642; B60L 2260/32; H04L 2012/40215; H04L 2012/40273; H04L 12/40; Y02T 90/12; Y02T 90/16
USPC .......................................................... 701/70
See application file for complete search history.

(56) References Cited

U.S. PATENT DOCUMENTS

| | | |
|---|---|---|
| 2003/0150352 A1 | 8/2003 | Kumar |
| 2013/0257144 A1 | 10/2013 | Caldeira et al. |
| 2015/0060160 A1 | 3/2015 | Kerschl et al. |

FOREIGN PATENT DOCUMENTS

| | | |
|---|---|---|
| DE | 102016204090 A1 | 9/2017 |
| EP | 2707936 A2 | 3/2014 |
| EP | 3150422 A1 | 4/2017 |
| JP | 4372771 A | 1/2008 |
| KR | 20200013474 A | 2/2020 |
| WO | 2012154990 A2 | 11/2012 |
| WO | 2012154990 A3 | 12/2012 |
| WO | 2012154990 A9 | 2/2013 |
| WO | 2016156383 A1 | 10/2016 |
| WO | 2018064622 A1 | 4/2018 |
| WO | 2020068637 A1 | 4/2020 |

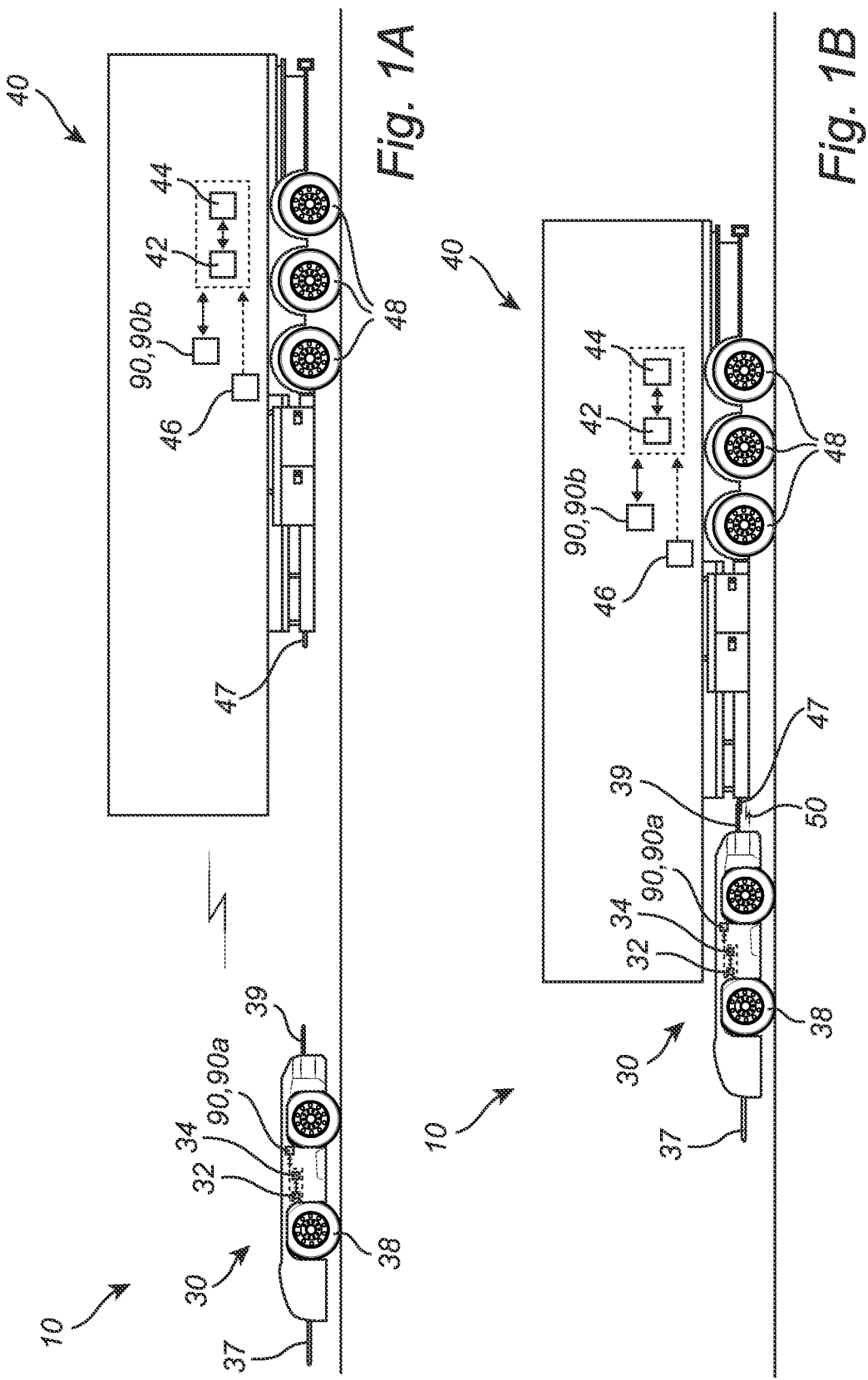

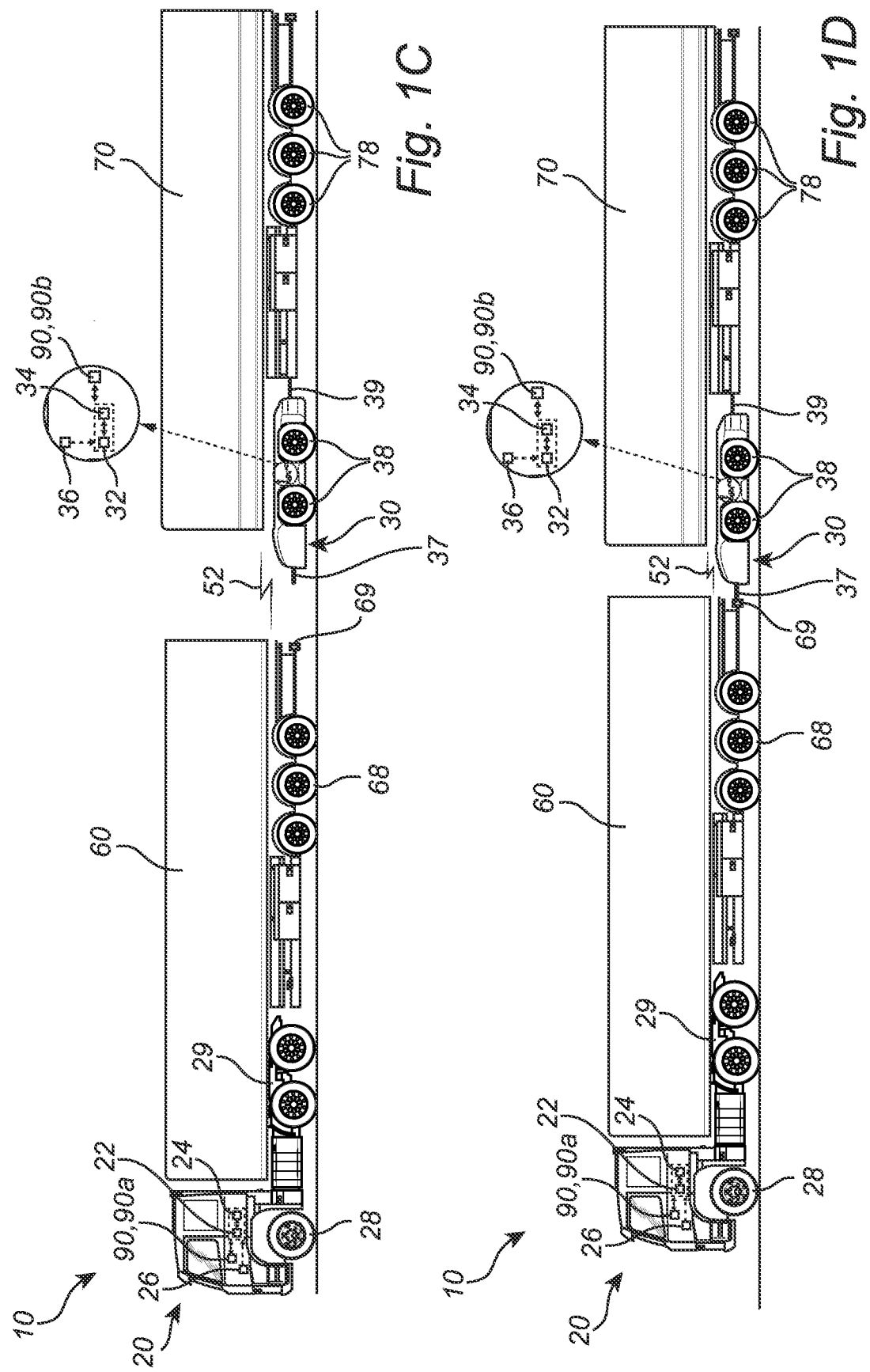

METHOD FOR CONTROLLING A VEHICLE COMBINATION

RELATED APPLICATIONS

The present application claims priority to European Patent Application No. 20210939.3, filed on Dec. 1, 2020, and entitled "METHOD FOR CONTROLLING A VEHICLE COMBINATION," which is incorporated herein by reference in its entirety.

TECHNICAL FIELD

The present disclosure relates to a method for controlling transfer of electrical energy in a coupling between a first vehicle and a second vehicle of a vehicle combination. The present disclosure also relates to a control system as well as a vehicle combination comprising such a control system. The present disclosure is applicable to any type of vehicle combinations comprising at least a towing vehicle and a towed vehicle connected to each other by a coupling. In particular, the present disclosure relates to heavy-duty vehicles, such as trucks and construction equipment, and more specifically to a vehicle combination with powered dolly vehicles comprising one or more dolly vehicles.

Although the disclosure will mainly be directed to a vehicle combination in the form of a first autonomous vehicle and a second autonomous vehicle, such as an autonomous truck and an autonomous dolly, it may also be applicable for other types of vehicles such as vehicle combinations powered by an electric machine, including partly autonomous vehicle combinations, truck-trailer combinations etc. The present disclosure is also applicable to inductive couplings between the first vehicle and the second vehicle.

BACKGROUND

In the field of heavy-duty vehicles there is an increasing demand for providing more efficient transportation vehicle systems, that may also be fully, or at least partly, autonomous. In an attempt to meet this demand, the operational capacity of heavy-duty vehicles can be increased by e.g. vehicle combinations with a plurality of vehicle units in the form of trailer units. As such, the vehicle combination is able to transport a substantive amount of material when driving from one position to another.

Furthermore, some vehicle combinations may include one or more dolly vehicles to allow for additional trailer units to be towed by the same tractor unit. In this manner, the cargo transport ability may be further extended. Dolly vehicles can be provided in several different configurations, such as traditional unpowered dolly vehicles configured to connect with the tractor unit or another trailer. Other types of dolly vehicles may refer to powered dolly vehicles, such as electric-powered dolly vehicles, and/or steerable dolly vehicles. Dolly vehicles can also be configured to operate as partly or fully autonomous vehicles.

Although such vehicle combinations are commonplace today, the use of power and the distribution of e.g. traction power between the vehicle units are still oftentimes not satisfactory.

There is thus a desire for improved systems and methods of controlling energy transfer in vehicle combinations including one or more vehicle, in particular for vehicle combinations including one or more electric dolly vehicles.

SUMMARY

It is an object of the present disclosure to at least partially overcome the above described deficiencies and to provide an improved control of transferring excessive electrical energy between a first vehicle and a second vehicle of a coupled vehicle combination.

According to a first aspect, there is provided a method for controlling transfer of electrical energy in a coupling between a first vehicle and a second vehicle of a vehicle combination, each one of the first and second vehicles having an electric machine and an energy storage system, ESS, wherein at least the electric machine of the second vehicle is operable in a traction mode and a generator mode for generating electrical energy during a regenerative braking event of the second vehicle. The method comprises determining an amount of possible excessive energy from the braking event of the second vehicle, determining a total energy level of the second vehicle, determining a total energy level of the first vehicle, comparing the determined amount of possible excessive energy with the determined total energy levels of the first vehicle and second vehicle, and controlling direction of the transfer of electrical energy between the first vehicle and the second vehicle based on the comparison.

The method of the present disclosure provides for an improved handling of energy generated from a regenerative braking event of the second vehicle. In particular, it becomes possible not only to control transfer of excessive electrical energy from the second vehicle to the first vehicle, but also to determine when it is most efficient to transfer excessive energy from the second vehicle to the first vehicle. Excessive electrical energy may for instance be generated in driving situations when an electric motor of a dolly vehicle and/or trailer is rotating because of external forces, such as descending from a hill, or when the motor is used for braking. In these situations, the electric motor operates as a generator. The present disclosure is thus based on the insight on how to reuse generated excess energy from a secondary vehicle of a vehicle combination, such as an electric powered dolly vehicle or an electric powered trailer.

An advantage of the present disclosure is thus that the use of energy from a braking event may not only be possible to use for powering electrical equipment in the truck, but also to determine and direct excessive energy from the secondary vehicle to the truck, or the like. In this manner, it becomes possible to optimize the overall energy use of the entire vehicle combination.

Typically, although strictly not required, the provision of determining an amount of possible excessive energy from the braking event of the second vehicle is determined during the regenerative braking event. However, it may also be possible to predict possible excessive energy from an upcoming braking event of the second vehicle in beforehand based on the operational parameters, as mentioned herein.

The term "first vehicle", as used herein, may generally refer to the primary vehicle of the vehicle combination, such as a towing vehicle, e.g. a tractor, cab or truck, or a first powered dolly vehicle. The first vehicle may be an electric vehicle, hybrid vehicle or the like, using the electric machine at least partly for traction power. That said, the first vehicle may be a hybrid vehicle comprising an internal combustion engine (ICE), such as diesel-type ICE, H2-ICE or the like. According to at least one example embodiment, the first vehicle is an autonomous vehicle, such as an electric vehicle, hybrid vehicle, in particular a towing vehicle, tractor unit of a truck or a dolly vehicle. Accordingly, the first vehicle may refer to an autonomous vehicle, such as an autonomous towing vehicle, an autonomous tractor of a truck, an autonomous dolly vehicle or the like.

The term "second vehicle", as used herein, may generally refer to a secondary vehicle of the vehicle combination, in particular a self-powered vehicle. According to at least one example embodiment, the second vehicle is a powered dolly vehicle, such as an autonomous dolly vehicle, e.g. an electric autonomous dolly vehicle. According to at least one example embodiment, the second vehicle is a powered trailer, such as an electric-powered trailer. While the second vehicle may generally be a powered dolly vehicle or a powered trailer, the second vehicle may also be provided in other ways and also both with fully or partly electrical configurations.

It should also be noted that the vehicle combination may comprise additional vehicle units, such as additional autonomous dolly vehicle with corresponding trailers. Thus, the present disclosure is equally applicable for a vehicle combination comprising an arbitrary combination of vehicle, such as a third vehicle, a fourth vehicle, etc. The vehicle combination may generally be an articulated vehicle combination. An articulated vehicle combination refers to vehicle combination in which the first vehicle is mechanically coupled to the second vehicle by an articulated mechanical coupling.

As used herein, the term "dolly vehicle" may refer to a powered vehicle unit configured to connect a pair of trailers to each other such that the trailers move with respect to each other when the vehicle combination is in motion. A dolly vehicle is thus configured to extend the range and/or improve motion management of the vehicle combination. As used herein, the dolly vehicle is typically powered by its electric machine, and may thus be considered a self-powered vehicle unit, sometimes simply denoted as a powered dolly vehicle. The powered dolly vehicle may comprise one or more steerable axles. According to at least one example embodiment, the powered dolly vehicle is an autonomous dolly vehicle with one or more driven axels and one or more steerable axles. Autonomous dolly vehicles are self-powered vehicles and may provide both increased fuel efficiency and maneuverability. Increased fuel efficiency is for instance obtained if an electric machine arranged for regenerative braking is installed in the dolly vehicle. The vehicle combination then effectively becomes a hybrid electric vehicle, even if the towing vehicle only comprises a traditional diesel engine with no electric hybridization. To distribute propulsion in the vehicle combination, some of the vehicle units can be equipped with propulsion systems. The dolly vehicle may be particularly useful for having its own propulsion system because the dolly vehicle is generally easy to decouple from the towing vehicle, or from trailer of the truck, and may not even be at a standstill when loading and unloading cargo into the trailer unit. As mentioned above, it may also be possible that the dolly vehicle comprises one or more steerable axles for improving turning ability of the combination vehicle, since the dolly vehicle can be used to steer a second trailer as the vehicle combination turns in order to reduce the total area swept by the vehicle combination.

The total energy level of the second vehicle may comprise different sets of data depending on type of vehicle. By way of example, the total energy level includes data indicating state-of-charge (SOC) of the ESS of the second vehicle. In addition, or alternatively, the total energy level may include current energy need for powering auxiliaries of the second vehicle and future energy need of the second vehicle for a given time period. Such data can be gathered by various sensors and the control system, as is commonly known in the art. To this end, the total energy level of the second vehicle may correspond to the prevailing SOC of the ESS, while including predictive energy demands for the second vehicle for a given time period.

The total energy level of the first vehicle may also comprise different sets of data depending on type of vehicle. By way of example, the total energy level includes data indicating state-of-charge (SOC) of the ESS of the first vehicle. In addition, or alternatively, the total energy level may include current energy need for powering auxiliaries of the first vehicle and future energy need of the first vehicle for a given time period. Such data can be gathered by various sensors and the control system, as is commonly known in the art. To this end, the total energy level of the first vehicle may correspond to the prevailing SOC of the ESS, while including predictive energy demand for the first vehicle for a given time period.

The provision of comparing the determined amount of possible excessive energy with the determined total energy levels of the first vehicle and second vehicle may generally comprise the first step of comparing the determined amount of possible excessive energy with the determined total energy level of the second vehicle and subsequently comparing the determined amount of possible excessive energy with the determined total energy level of the first vehicle. Optionally, if the determined total energy level of the second vehicle is above a threshold indicating an energy surplus level, and if the determined total energy level of the first vehicle is below a threshold, the method may comprise directing transfer of energy generated during the regenerative braking event of the second vehicle from the second vehicle to the ESS of the first vehicle. In this manner, the method provides for an improved handling of energy transfer between the two vehicles such that energy is transferred based on predicted energy demands in the two vehicles.

Typically, the threshold indicating an energy surplus level in the second vehicle may correspond at least to an energy surplus level indicating that the ESS energy level of the second vehicle is above a minimum state-of-charge (SOC) of the ESS of the second vehicle.

Similarly, the threshold indicating that the total energy level of the first vehicle is below the threshold may typically correspond at least to an energy level indicating that the ESS energy level of the first vehicle is below a minimum SOC of the ESS of the first vehicle.

According to at least one example embodiment, the second vehicle comprises a regenerative braking control unit in communication with the corresponding electric machine. The regenerative braking control unit is configured to control the electric machine in the generator mode so as to generate electrical energy during the braking event. The regenerative braking control unit may also be connected to the ESS. The regenerative braking unit may either be an integral part of the electric machine or a separate part operatively connected to the electric machine. In addition, the regenerative braking control unit may be an integral part of the control system of the vehicle combination.

Optionally, when the electric machine is in the generator mode for generating electrical energy during the braking event, the electric machine may be operable to apply a regenerative braking force to at least one of a wheels or a pair of wheels of the second vehicle so as to convert kinetic energy to electrical energy.

According to at least one example embodiment, the amount of possible excessive energy from the braking event of the second vehicle is determined based on an operational parameter of any one of the first vehicle and the second vehicle.

By way of example, the operational parameter contains any one of the following data: data relating to an upcoming vehicle path, such as a downhill and uphill path; data relating to a change in vehicle speed, data relating to a change in acceleration, data relating to state-of-charge, SOC, of the ESS, data relating to determined voltages and currents levels in any one of a bidirectional DC/AC converter or a DC/DC converter, characteristics of the electric machine in any one of the first vehicle and the second vehicle, data relating to the weight of the first vehicle and the second vehicle, data indicating type of vehicle combination.

According to at least one example embodiment, the transfer of electrical energy is performed by means of an inductive coupling between the first vehicle and the second vehicle. An inductive coupling between the first vehicle and the second vehicle provides for a more secure and safer transfer of energy between the vehicles.

According to at least one example embodiment, the transfer of electrical energy is performed by means of a conductive coupling between the first vehicle and the second vehicle. This type of coupling may provide for a more efficient type of energy transfer between the vehicles. A conductive coupling may comprise corresponding connectors arranged on the first and second vehicles.

According to a second aspect, there is provided a control system comprising processing circuitry configured to perform the method according to the above described aspect. Further effects and features of the second aspect are largely analogous to those described above in relation to the first aspect.

The control system may include one or more control units comprised on-board each one of the vehicles of the vehicle combination. The control system and each one of the corresponding control units may include a microprocessor, microcontroller, programmable digital signal processor or another programmable device. The control system and each one of the corresponding control units may comprise modules in either hardware or software, or partially in hardware or software and communicate using known transmission buses such as CAN-bus and/or wireless communication capabilities. The processing circuitry may be a general purpose processor or a specific processor. The control system and each one of the corresponding control units typically comprises a non-transistory memory for storing computer program code and data upon. Thus, the control unit may be embodied by many different constructions. While the example embodiments of the control system described above can include one or more control units being integral parts thereof, it is also possible that the one or more control units may be separate parts of the vehicle combination, and/or arranged remote from the vehicle combinations and in communication with each one of the vehicles of the vehicle combination. Parts of the control system may also be provided in the form of a cloud server arranged in networked communication with the vehicle combination. Parts of the control system may also be implemented using a cloud server being network connected to an electronic control unit (ECU) comprised with the vehicle combination.

Optionally, the control system may also comprise a remote-control unit. Optionally, any one of the control units may be connected to the remote-control unit or server via a wireless link. This remote-control unit may be connected to a communications network, such as a communications network defined by the third-generation partnership program, 3GPP. Examples of such networks include 4G, 5G and 6G communication networks, as well as networks in the 802.11 family, in particular 802.11p. The remote-control unit may, e.g., be comprised in a control tower arranged to control powered dolly vehicles in a cargo terminal. In this case, the powered dolly vehicle is configured to enter into a slave mode configuration and receive requests from the control tower in a way similar to when it is connected to a master towing vehicle.

According to a third aspect, there is provided a computer program comprising program code means for performing the steps of any one of the embodiments described above in relation to the first aspect when the program is run on a computer or on processing circuitry of a control system. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of magnetic, optical or solid-state type. Still within the scope of "data carrier", such memories may be fixedly mounted or portable.

According to a fourth aspect, there is provided a computer readable medium carrying a computer program comprising program means for performing the steps of any one of the embodiments described above in relation to the first aspect when the program means is run on a computer or on processing circuitry of a control system.

According to a fifth aspect, there is provided a vehicle combination formed by a first vehicle and a second vehicle. The vehicle combination comprises a control system according to the above described second aspect for performing the steps of any one of the embodiments described above in relation to the first aspect. By way of example, the first vehicle is any one of an autonomous vehicle, such as an autonomous towing vehicle, autonomous tractor of a truck, and an autonomous dolly vehicle. By way of example, the second vehicle is any one of an autonomous dolly vehicle and a powered trailer unit.

According to at least one example embodiment, the vehicle combination is an articulated vehicle combination, comprising a first vehicle in the form of tractor unit, a first trailer unit coupled to the tractor unit by a first articulated coupling, a second vehicle in the form of a powered dolly vehicle, the powered dolly vehicle being coupled to the first trailer unit by a second articulated coupling, a second trailer unit coupled to the powered dolly by a third articulated coupling, and the control system according to the above described second aspect for performing the steps of any one of the embodiments described above in relation to the first aspect.

According to a sixth aspect, there is provided a vehicle for forming a vehicle combination with another vehicle, the vehicle comprising a control system according to the above described second aspect for performing the steps of any one of the embodiments described above in relation to the first aspect, when coupled to the another vehicle.

Effects and features of the third, fourth, fifth and sixth aspects are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein:

FIGS. 1a and 1b are lateral side views illustrating an example embodiment of a vehicle combination in the form of a first vehicle and a second vehicle, in which the first vehicle is an autonomous dolly and the second vehicle is an electric powered trailer;

FIGS. 1c and 1d are lateral sides view illustrating an example embodiment of a vehicle combination in the form of a first vehicle and a second vehicle, in which the first vehicle is an autonomous truck and the second vehicle is an autonomous dolly coupled to a trailer;

DETAILED DESCRIPTION

Figure 2:
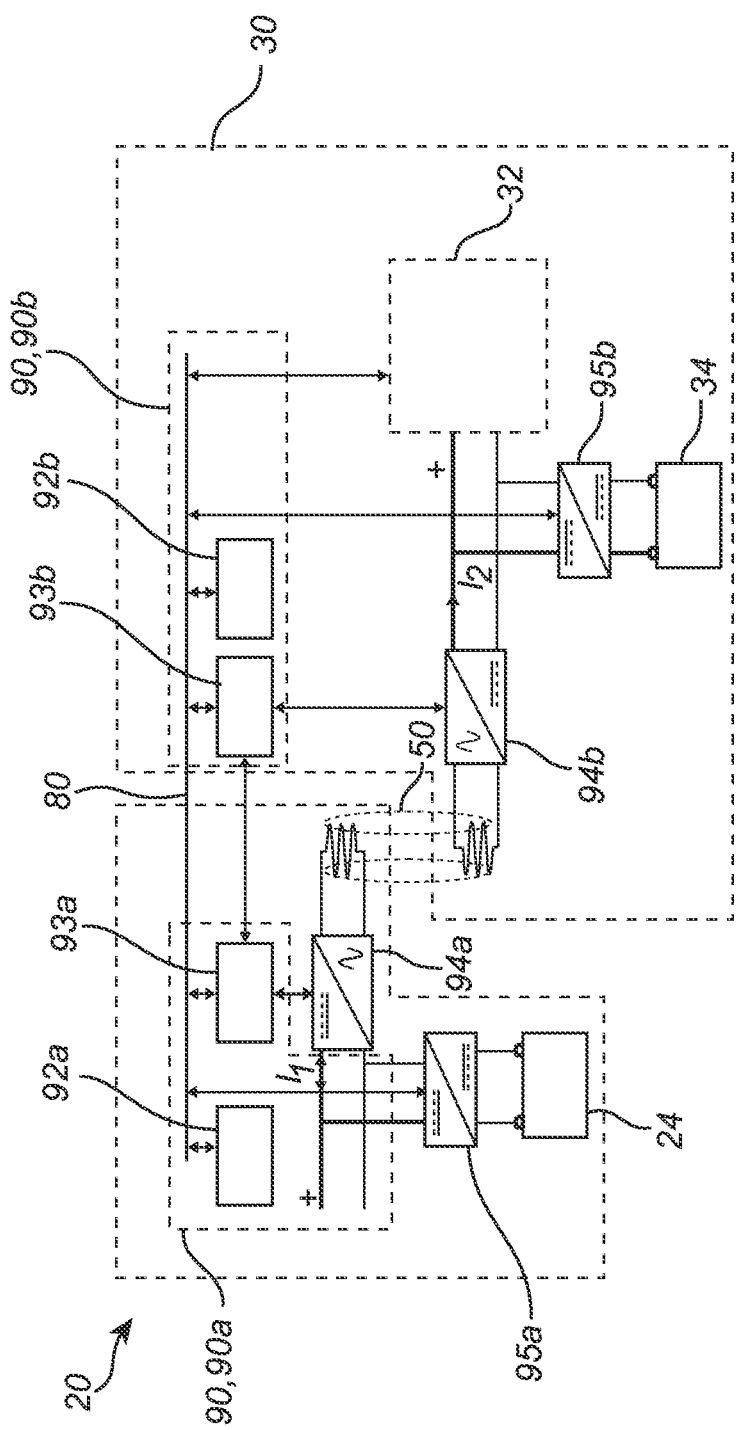
FIG. 2 schematically shows a control system for controlling energy transfer between the vehicles of the vehicle combination in FIGS. 1c and 1d according to an example embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Referring now to the drawings and to FIGS. 1a and 1b in particular, there is depicted an exemplary vehicle combination 10 in the form of a first vehicle configured to be coupled to a second vehicle. The vehicle combination is particularly suitable for cargo transport where the herein disclosed techniques can be applied with advantage. The vehicle combination here comprises a first vehicle in the form of an autonomous dolly vehicle 30 and a second vehicle in the form of an electrified trailer 40. FIG. 1a illustrates the vehicle combination when the autonomous dolly vehicle 30 and the trailer 40 are in an uncoupled arrangement, while FIG. 1b illustrates the vehicle combination in a coupled arrangement. The vehicle combination 10 also comprises a control system 90, as will be further described in relation to FIGS. 2 to 4. The control system may of course also be implemented in other types of vehicle combinations.

FIGS. 1c to 1d illustrate another exemplary vehicle combination in the form of a first vehicle connected to a second vehicle. In FIGS. 1c and 1d, the vehicle combination comprises a first vehicle in the form of an autonomous truck 20 and a second vehicle in the form of an autonomous dolly vehicle 30 coupled to a semi-trailer 60 of the truck 20. The trailer 60 may also be an electrified trailer, but may likewise be a conventional non-powered trailer, as illustrated in FIGS. 1c and 1d. The vehicle combination 10 here also comprises a second trailer 70 coupled to the rear part of the dolly vehicle 30. Furthermore, FIG. 1c illustrates the vehicle combination when the autonomous truck 20 and the autonomous dolly vehicle 30 are in an uncoupled arrangement, while FIG. 1d illustrates the vehicle combination in a coupled arrangement.

It should be noted that the first vehicle and the second vehicle may necessary not always be autonomous vehicles, but other types of vehicles are likewise conceivable, as will be readily appreciated from the disclosure. Also, for ease of referring to the autonomous vehicles 20 and 30, the following description may simply refer to the autonomous truck 20 as the truck 20 and the autonomous dolly vehicle 20 as the dolly vehicle 20.

In the example embodiment in FIGS. 1a and 1b, and also in the example embodiment in FIGS. 1c and 1d, each one of the vehicles 20, 30 and 40 generally comprises a corresponding electric machine 22, 32 and 42 and a corresponding energy storage system, ESS, 24, 34 and 44, respectively. By way of example, the ESS is a high voltage battery, as is commonly known in the art. The electric machines of the vehicles are generally arranged to provide traction power to the corresponding vehicles, and to the vehicle combination when the vehicles are coupled to each other.

Moreover, each one of the vehicles/vehicle units 20, 30 and 40 comprises at least one pair of wheels 28, 38 and 48, but may often include a number of additional pair of wheels. At least some of the pair of wheels of each vehicle are driven by means of the electric machine. It may also be noted that the trailers 60 and 70 in FIGS. 1c and 1d may have corresponding wheels 68 and 78. It should be readily appreciated that several different configurations may be conceivable depending on type of vehicle combination. By way of example, the truck may likewise be a diesel-type truck with an internal combustion engine, or a hybrid truck including an internal combustion engine and the electric machine, where the ESS is provided in the form of a 48-voltage system rather than a high voltage system.

Further, as is commonly known in the art, each one of the electric machines 22, 32 and 42 are typically operable in a generator mode for generating electrical energy during a regenerative braking event of the second vehicle. In some example embodiments, as illustrated in e.g. FIGS. 1c and 1d, the dolly vehicle 30 comprises a regenerative braking control unit 36 for controlling the electric machine in the generator mode so as to generate electrical energy during the braking event. Analogously, the trailer, e.g. the trailer 40 in FIGS. 1a and 1b, comprises a corresponding regenerative braking control unit 46. It may of course also be conceivable that the other vehicles of the vehicle combination may include similar regenerative braking control units (although not shown). The regenerative braking control unit typically communicates with the control unit of the vehicle to regulate the braking effect in view of the operation of the vehicle and also cooperates with any other type of auxiliary braking system of the vehicle, as is commonly known in the art. To this end, while again referring to the vehicle combination in FIGS. 1c and 1d, when the electric machine 32 of the dolly vehicle 30 is in the generator mode for generating electrical energy during the braking event, the electric machine 32 is operable to apply a regenerative braking force to at least one of a wheels 38, or a pair of wheels, of the dolly vehicle 30 so as to convert kinetic energy to electrical energy. In accordance with the example embodiments of the disclosure, the generated electricity may be transferred to the truck 20, as will be further disclosed hereinafter in relation to FIGS. 2 to 4.

The vehicles of the vehicle combination can be mechanically coupled to each other in several different ways, e.g. by an articulated coupling. By way of example, as illustrated in FIGS. 1a to 1b, the dolly vehicle 30 comprises a front drawbar connection 37 and a rear drawbar connection 39 for coupling with another vehicle, such as a drawbar connection 47 of the trailer 40. Analogously, the trailer 40 comprises the drawbar connection 47 for connecting with the dolly vehicle 30. In addition, or alternatively, one or more of the vehicles of the vehicle combination may be mechanically coupled to each other by means of a conventional fifth wheel configuration. In the example embodiment illustrated in FIGS. 1c and 1d, the truck 20 comprises a fifth wheel configuration 29 for the trailer 60. The dolly vehicle 30 in FIGS. 1c and 1d, however, comprises a front drawbar 37 for connecting with the trailer 60 and a rear drawbar 39 for connecting with the trailer 70. It should be noted that drawbar connection generally refers to a two-piece connection, where a drawbar attachment mechanism is arranged on one of the vehicles while a drawbar is arranged on the other vehicle.

In other words, the vehicle combination in FIGS. 1c and 1d illustrates an arrangement of a number of vehicles so as to extend the cargo transport capability of the vehicle combination. In this type of vehicle combination, the dolly vehicle 30 can e.g. be connected to the rear of the first trailer 60. This dolly vehicle 30 can then tow a second trailer 70, as illustrated in e.g. FIG. 1d. In the vehicle combination illustrated in FIGS. 1a and 1b, on the other hand, the dolly vehicle 30 is the towing vehicle and operates in an autonomous, or at least in a partly semi-autonomous manner. The dolly vehicle can then autonomously or via remote control maneuver the first trailer unit 40, for instance to park the trailer.

It is also conceivable that more than one dolly vehicle can be added to a vehicle combination in order to tow more than one extra trailer unit. The concepts disclosed herein may also be extended to multiple trailers towed by one tractor. It may also be possible that the dolly vehicle comprise one or more steerable axles for improving turning ability of the combination vehicle, since the dolly vehicle can be used to steer the second trailer unit 70 as the vehicle combination turns in order to reduce the total area swept by the vehicle combination.

As mentioned above, the vehicle combination 10 comprises the control system 90. The control system 90 is generally configured to perform a method for controlling energy transfer between coupled vehicles of the vehicle combination 10. In the following description of the control system 90 and the method for controlling energy transfer between the vehicles, the first vehicle will be referred to as the truck 20 in the example embodiment of FIGS. 1c and 1d, while the second vehicle will be referred to as the dolly vehicle 30 in the example embodiment of FIGS. 1c and 1d. However, it should be readily appreciated that the following description in relation to FIGS. 2 to 4 may likewise be applicable to the example embodiment of FIGS. 1a to 1b above, or in any other possible vehicle combination.

Turning now to FIG. 2, there is depicted parts of the control system 90, according to one example embodiment. The control system 90 is here arranged as a component of the vehicle combination 10, as shown in FIGS. 1c and 1d. The control system 90 is configured to control transfer of electrical energy between the truck 20 and the dolly vehicle 30. The control system 90 comprises processing circuitry 92 comprised in the vehicle combination 10. In particular, the control system 90 is configured to determine an amount of possible excessive energy from a braking event of the dolly vehicle 30, determine a total energy level of the dolly vehicle 30, determine a total energy level of the truck 20, compare the determined amount of possible excessive energy with the determined total energy levels of the truck 20 and dolly vehicle 30, and control direction of the transfer of electrical energy between the truck 20 and the dolly vehicle 30 based on the comparison.

Furthermore, if the determined total energy level of the dolly vehicle 30 is above a threshold indicating an energy surplus level, and if the determined total energy level of the truck 20 is below a threshold, the control system 90 typically determines to direct (transfer) the energy generated during the regenerative braking event of the dolly vehicle 30 from the dolly vehicle 30 to the ESS 24 of the truck 20. In an operational situation where the above conditions are not met, the control system 90 may generally direct energy to the ESS (battery) 34 of the dolly vehicle 30 if the determined total energy level of the dolly vehicle 30 does not amount to a surplus energy level. Analogously, if the determined total energy level of the truck 20 is sufficient, e.g. the ESS 24 of the truck 20 is fully charged, the control system may determine not to direct energy from the dolly vehicle 30 to the truck 20, but rather to use the surplus energy for other purposes, such as directing the energy to one or more auxiliary electronic systems of the dolly vehicle 30 or charging the ESS of the dolly vehicle if (when) needed.

The above-mentioned threshold indicating an energy surplus level in the dolly vehicle 30 here corresponds to at least indicating that the ESS 34 energy level of the dolly vehicle 30 is above a minimum state-of-charge (SOC) of the ESS 34.

Similarly, the above-mentioned threshold indicating that the total energy level of the truck 20 is low, i.e. below the threshold, here corresponds to at least indicating that the ESS 24 energy level of the truck 20 is below a minimum SOC of the ESS 24.

Figure 4:
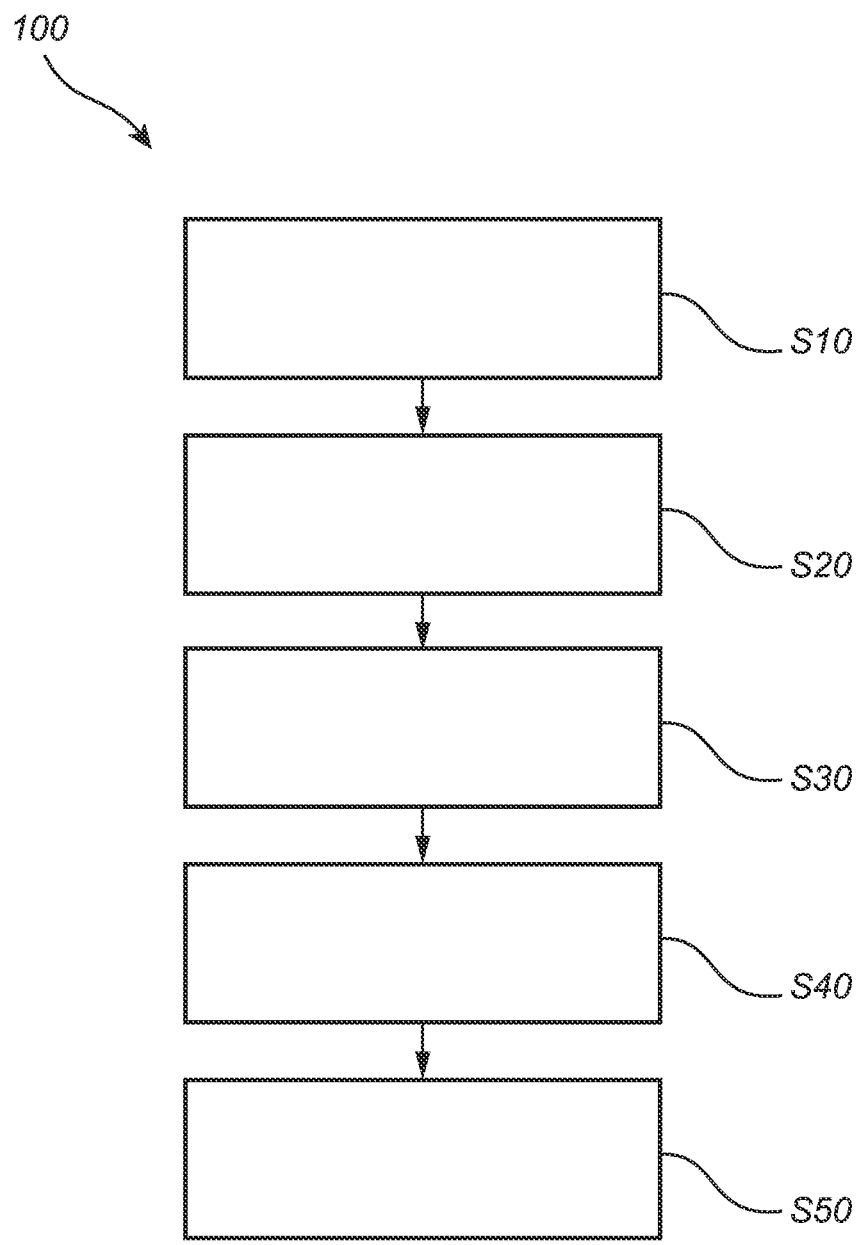
FIG. 4 is a flow chart of a method for controlling energy transfer between the vehicles of the vehicle combination in FIGS. 1a and 1b and/or FIGS. 1c and 1d, according to an example embodiment.

As mentioned above, the control system 90 here comprises processing circuitry 92 configured to perform the steps of the method 100 as will be further described in relation to FIG. 4. While parts of the control system 90 and the processing circuitry 92 may be comprised in different locations of the vehicle combination depending on type of vehicles of the vehicle combination, it may generally be an advantage to incorporate one or more sub-control units in each one of the vehicles making up the vehicle combination so as to provide for an efficient control of the energy transfer between the vehicles.

The control system 90, as exemplified in FIG. 2, comprises a first vehicle control unit 90a comprised with the truck 20 and a second vehicle control unit 90b comprised with the dolly vehicle 30. Each one of the control units 90a and 90b generally comprises processing circuitry 92a and 92b which may each include a microprocessor, microcontroller, programmable digital signal processor or another programmable device. Each one of the processing circuitry 92a and 92b may also, or instead, each include an application specific integrated circuit, a programmable gate array or programmable array logic, a programmable logic device, or a digital signal processor. Where each one of the processing circuitry 92a and 92b includes a programmable device such as the microprocessor, microcontroller or programmable digital signal processor mentioned above, the processor may further include computer executable code that controls operation of the programmable device. It should be understood that all or some parts of the functionality provided by the one or more of the processing circuitry 92a and 92b may be at least partly in communication with the described components of the control system 90.

Further, in an autonomous vehicle combination, it may be noted that the control system may operate the vehicle combination 10 in a common way when the truck 20 and the dolly vehicle 30 are in a coupled configuration, as shown in e.g. FIG. 1d, while the truck 20 and the dolly vehicle 30 may generally be operated by their corresponding first vehicle control unit 90a and second vehicle control unit 90b in an uncoupled mode, i.e. when the vehicles are operated independent from each other. When the truck 20 and the dolly vehicle 30 form the vehicle combination 10, the first vehicle control unit 90a of the truck 20 is generally the "master", while the dolly vehicle 30 is configured to be autonomous when disconnected from the truck etc. Hence, as long as the truck 20 is connected to the dolly vehicle 30, the truck 20 acts as master, while the one or more dolly vehicles operate in a slave mode. When the dolly vehicle 30 decouples from the master control unit 90a, however, the slave mode in the dolly vehicle 30 is shifted to master mode, and the dolly vehicle is operable as an autonomous vehicle. The communication between the master and slave mode control units 90a and 90b is either via wireless connection such as a unit to unit (U2U) communication or via some form of wired communication such as Ethernet communication between units.

While referring again to the example embodiment in FIG. 2, the coupling for transferring energy between the truck 20 and dolly vehicle 30 is an inductive coupling 50. The inductive coupling 50 is provided in the form of a common type of inductive coupling having a first coil 52a arranged at the truck 20 and a second coil 52b arranged at the dolly vehicle 30.

In order to handle the transfer of the energy between the vehicles via the inductive coupling, each one of the vehicles 20 and 30 comprises corresponding converters. Hence, the truck 20 here comprises a conventional bidirectional DC/AC converter 94a for power conversion. Analogously, the dolly vehicle 30 comprises a corresponding bidirectional DC/AC converter 94b for power conversion.

The truck 20 also comprises a conventional charge controller 95a that is in electrical connection with the bidirectional DC/AC converter 94a. The charge controller 95a is also in electrical connection with the ESS 24. If the truck 20 is an electric truck, as shown in FIGS. 1c and 1d, the bidirectional DC/AC converter 94a is generally also in electrical connection with the electric machine 22 (although not shown in FIG. 2). Moreover, each one of the above components are in communication with the first vehicle control unit 90a.

Analogously, the dolly vehicle 30 comprises a corresponding conventional charge controller 95b that is in electrical connection with the bidirectional DC/AC converter 94b. The charge controller 95b is also in electrical connection with the ESS 34. Further, the bidirectional DC/AC converter 94b is in electrical connection with the electric machine 32. The electric machine may here include a motor controller for coordinating the operation of the electric motor of the electric machine, as is commonly known in the art. Moreover, each one of the above components are in communication with the second vehicle control unit 90b.

The first and second vehicle control units 90a and 90b are also in communication with each other via a communication interface 80. The communication interface is here a common data bus. However, the communication between the first and second vehicle control units 90a and 90b can either be by wire or by wireless link, such as a communications network defined by the third-generation partnership program, 3GPP.

Examples of such networks include 4G, 5G and 6G communication networks, as well as networks in the 802.11 family, in particular 802.11p.

Each one of the first and second vehicle control units 90a and 90b are configured to communicate with the above components as well as with each other. The control system 90 has also access to relevant vehicle information from the first and second vehicles, as mentioned below. In addition, or alternatively, the control system 90 may comprise a memory for storing such information. Examples of control signals and/or data that may be communicated to the control system are operational parameters for determining the amount of possible excessive energy from the braking event of the dolly vehicle 30.

By way of example, the operational parameter contains any one of the following data: data relating to an upcoming vehicle path, such as a downhill and uphill path; data relating to a change in vehicle speed, data relating to a change in acceleration, data relating to SOC of any one of ESS 24 and 34, data relating to determined voltages and currents levels in any one of the bidirectional DC/AC converters 94a and 94b, characteristics of the electric machines 22 and 32 in any one of the truck 20 and the dolly vehicle 30, data relating to the weight of any one of the truck 20 and the dolly vehicle 30, data indicating type of vehicle combination 10. It should be readily appreciated that the complete control function of the control system 90 is generally defined in view of the type of vehicle and type of electric machine, and may thus vary for different types of vehicles etc.

Thereafter, the amount of possible excessive energy from the braking event of the dolly vehicle 30 is determined based on one or more of the operational parameters of the truck 20 and the dolly vehicle 30.

Typically, although strictly not required, the amount of possible excessive energy from the braking event of the dolly vehicle 30 is determined during the regenerative braking event of the dolly vehicle 30. When the control system 90 has determined the amount of possible excessive energy from the braking event of the dolly vehicle 30, it generally determines the total energy level of the dolly vehicle 30, as mentioned above.

The total energy level of the dolly vehicle 30 comprises different sets of data depending on type of vehicle. However, the total energy level here includes data indicating state-of-charge (SOC) of the ESS 32. In addition, or alternatively, the total energy level may include current energy need for powering auxiliaries of the vehicle and future energy need for a given time period. Such data can be gathered by various sensors and the control system 90, as is commonly known in the art.

Furthermore, the control system 90 determines the total energy level of the truck 20, as mentioned above. The total energy level of the truck 20 comprises different sets of data depending on type of vehicle. However, the total energy level here includes data indicating state-of-charge (SOC) of the ESS 22. In addition, or alternatively, the total energy level may include current energy need for powering auxiliaries of the vehicle and future energy need for a given time period. Such data can be gathered by various sensors and the control system, as is commonly known in the art.

The control system 90 then compares the determined amount of possible excessive energy with the determined total energy levels of the truck 20 and the dolly vehicle 30, and subsequently controls direction of the transfer of electrical energy between the truck 20 and the dolly vehicle 30 based on the comparison. In particular, the processing circuitry 92a and 92b of the first and second vehicle control units 90a and 90b, each comprises a corresponding direction controller 93a and 93b for determining and controlling the direction of the energy transfer between the truck 20 and the dolly vehicle 30 based on the above comparison. More specifically, the control system 90 operates the direction controllers 93a and 93b either to block or change the direction of energy in the coupling based on the needed energy in the truck 20. That is, the control system 90 decides if the dolly vehicle 30 should power the truck 30, or vice versa. In particular, the control system 90 control the direction of energy transfer in accordance with the conditions above.

To sum up, when a vehicle combination is formed between the truck 20 and the dolly vehicle 30, the operation of the dolly vehicle 30 is mainly controlled by the control units 90a and 90b and the corresponding processing circuitry 92a and 92b. Furthermore, the direction controllers of the control units, the charge controllers 95a and 95b and a motor controller (not shown) of the electric machine 32 are configured to exchange information via the communication interface 80, such as a common data bus. Also, the bidirectional DC/AC converters 94a and 94b here exchange data through a bus, which may correspond to the communication interface 80. When the truck 20 acts as master, the control unit 90a informs the direction controllers of the control system 90 when it is time for breaking or accelerating. The control system 90 also have data on the currents I1 and I2, see FIG. 2, and information on the direction of the current I1 and I2 through the buses between the charge controllers 95a and 95b. By analysing the data from the above components, the direction controllers of the control system 90 may either change the direction of the current or stop the power exchange between the dolly 30 and the truck 20 based on the above comparison. In particular, the control system 90 control the direction of energy transfer in accordance with the conditions above.

In FIG. 2, the transfer of electrical energy is performed in the inductive coupling 40 between the truck 20 and the dolly vehicle 30. However, the example of the configuration in FIG. 2, including the operations of the control system 90, is only one conceivable example on how to transfer surplus energy from the dolly vehicle 30 to the truck 20.

Figure 3:
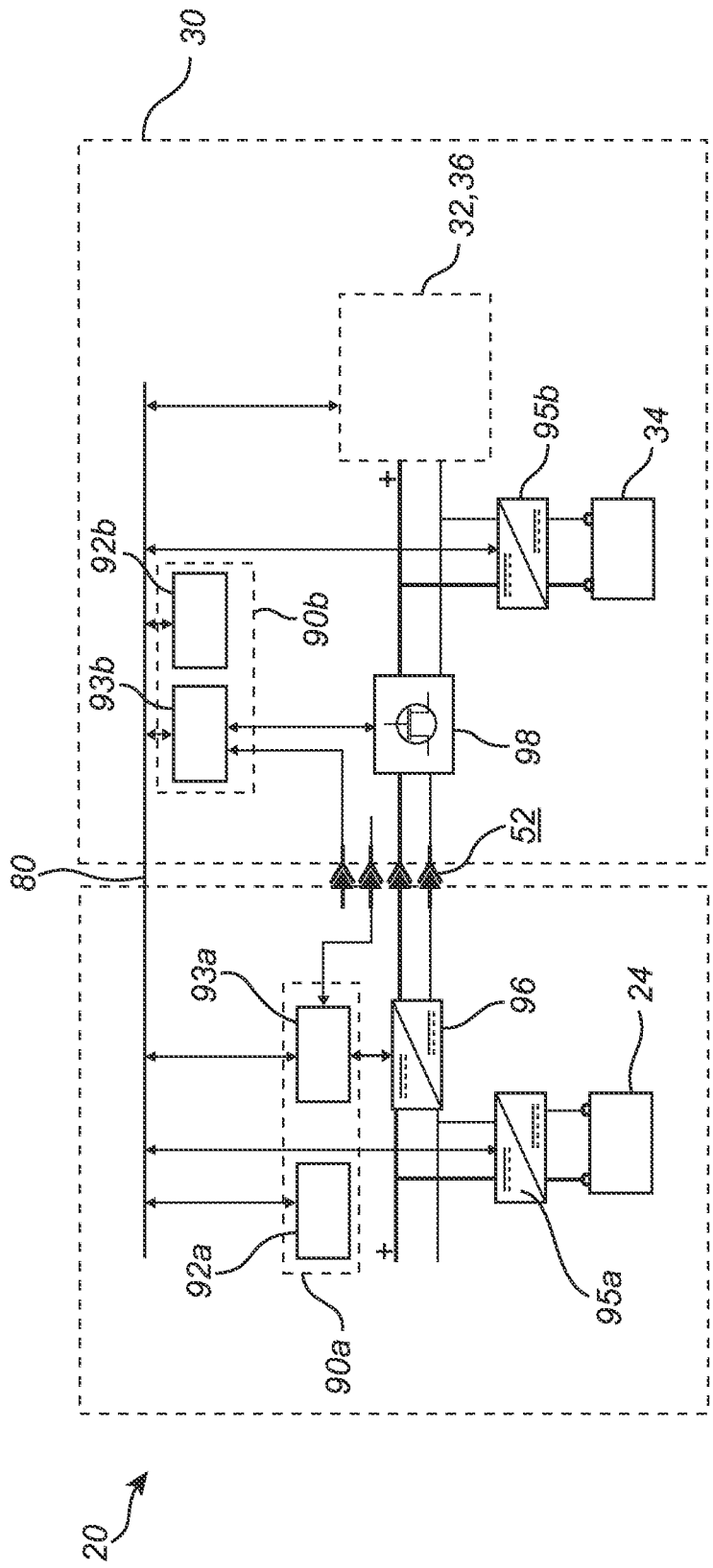
FIG. 3 schematically shows a control system for controlling energy transfer between the vehicles of the vehicle combination in FIGS. 1c and 1d according to another example embodiment.

In another example, the transfer of surplus energy from the dolly vehicle 30 to the truck 20 may be handled in a conventional conductive coupling 52, as exemplified by the configuration illustrated in FIG. 3. The conductive coupling is here provided in the form of a pair of conventional connectors arranged on the respective vehicles. The example embodiment in FIG. 3 is rather similar to the example embodiment in FIG. 2 in terms of integration and operation. However, due to that the coupling between the vehicles 20 and 30 is here a conductive coupling 52, another difference is that the example embodiment in FIG. 3 comprises a DC/DC converter 96 arranged in the truck 20. The DC/DC converter 96 is arranged in electrical connection with the coupling 52 and with the charge controller 95a. The DC/DC converter 96 may also be arranged in electrical connection with the electric machine 22. To this end, the bidirectional DC/AC converters in FIG. 2 have been replaced with the DC/DC converter so as to convert a source of direct current from one voltage level to another voltage level, as is commonly known in the art. Further, for a conductive coupling, the control system 90 may also include a safety mechanism so that power is only transferable if (when) the conductive coupling 52 is established between the vehicles 20 and 30. As such, the control system 90 also comprises a switch 97 arranged in the dolly vehicle 30. The switch 97 may be a conventional MOSFET switch for controlling and interrupting the current in the electrical connection if there is no contact between the connectors of the conductive coupling 52.

In FIG. 3, when a vehicle combination is formed between the truck 20 and the dolly vehicle 30, the operation of the dolly vehicle 30 is mainly controlled by the control units 90a and 90b and the corresponding processing circuitry 92a and 92b. Furthermore, the direction controllers 93a and 93b of the control units, the charge controllers 95a and 95b and a motor controller (not shown) of the electric machine 32 are configured to exchange information via the communication interface 80. Also, the DC/DC converter 96 here exchanges data with the control unit 90a through the communication interface 80, or via another data bus. For human and safety reasons, and also for extending the lifetime of the conductive coupling 52, the switch 97 is operable to postpone energy transfer to the conductive coupling 52 from the ESS 34 until a connection has been established and detected. The DC/DC converter 96 may generally provide the same functionality on the truck 20. To this end, the DC/DC converter 96 and the switch 97 are operable to block or prevent any voltages on the connectors of the conductive coupling a connection has been detected. When there is connection between the truck 20 and the dolly vehicle 30, the control system 90 is configured to control energy transfer in the conductive coupling 52 from the dolly vehicle 30 to the truck 20 in accordance with the method described in relation to FIGS. 2 and 4. In addition, in FIG. 3, the operational parameter may here also contain data relating to determined voltages and currents levels in the DC/DC converter 96.

Similar to the example in FIG. 2, when the truck 20 acts as master, the control unit 90a informs the direction controllers of the control system 90 when it is time for breaking or accelerating. The control system 90 also have data on the currents I1 and I2, see FIG. 3, and information on the direction of the current I1 and I2 through the buses between the charge controllers 95a and 95b. By analysing the data from the above components, the direction controllers of the control system 90 may either change the direction of the current or stop the power exchange between the dolly 30 and the truck 20 based on the above comparison.

Besides the above difference, the example embodiment in FIG. 3 may generally comprise any one of the components described above in relation to the example embodiment in FIG. 2.

In order to sum up, reference is made to FIG. 4, which is a flowchart of a method 100 for controlling the above described vehicle combination according to an example embodiment. During operation of the vehicle combination, one embodiment of the method 100 here comprises:
  determining S10 an amount of possible excessive energy from the braking event of the second vehicle,
  determining S20 a total energy level of the second vehicle,
  determining S30 a total energy level of the first vehicle,
  comparing S40 the determined amount of possible excessive energy with the determined total energy levels of the first vehicle and second vehicle, and
  controlling S50 direction of the transfer of electrical energy between the first vehicle and the second vehicle based on the comparison.

Furthermore, if the determined total energy level of the second vehicle is above a threshold indicating an energy surplus level, and if the determined total energy level of the first vehicle is below a threshold, the method further comprises the step of directing transfer of energy generated during the regenerative braking event of the second vehicle from the second vehicle to the ESS of the first vehicle.

The steps of the method are generally performed by the control system 90, as described above in relation to FIG. 2. Hence, it should be noted that the embodiments of the method may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

It should also be noted that the control system 90, and each one of the corresponding control units 90a and 90b, may for example be an electronic control unit (ECU), comprised with the vehicle combination 10, possibly manifested as a general-purpose processor, an application specific processor, a circuit containing processing components, a group of distributed processing components, a group of distributed computers configured for processing, a field programmable gate array (FPGA), etc. The control system 90 and each one of the corresponding control units 90a and 90b may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Also, although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. For example, the generalization of the present vehicle combinations to include additional vehicles, as described above, remains within the scope of the present invention. Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling transfer of electrical energy in a coupling between a first vehicle and a second vehicle of a vehicle combination, comprising:
   determining, by a control system comprising processing circuitry, an amount of possible excessive energy from a regenerative braking event of the second vehicle operable in a generator mode for generating electrical energy, each of the first vehicle and the second vehicle having an electric machine and an energy storage system (ESS), at least the electric machine of the second vehicle operable in a traction mode and the generator mode;
   determining, by the control system, a total energy level of the second vehicle,
   determining, by the control system, a total energy level of the first vehicle,
   comparing, by the control system, the determined amount of possible excessive energy with the determined total energy levels of the first vehicle and second vehicle, and
   controlling, by the control system, direction of the transfer of electrical energy between the first vehicle and the second vehicle based on the comparison.

2. The method of claim 1, further comprising:
   indicating an energy surplus level if the determined total energy level of the second vehicle is above a threshold, and
   directing transfer of energy generated during the regenerative braking event of the second vehicle from the second vehicle to the ESS of the first vehicle if the determined total energy level of the first vehicle is below a threshold.

3. The method of claim 1, wherein the second vehicle comprises a regenerative braking control unit in communication with the corresponding electric machine.

4. The method of claim 1, wherein, when the electric machine is in the generator mode for generating electrical energy during the regenerative braking event, the electric machine is operable to apply a regenerative braking force to at least one of a wheel or a pair of wheels of the second vehicle so as to convert kinetic energy to electrical energy.

5. The method of claim 1, wherein the amount of possible excessive energy from the braking event of the second vehicle is determined based on an operational parameter of at least one of the first vehicle or the second vehicle.

6. The method of claim 5, wherein the operational parameter contains at least one of:
data relating to an upcoming vehicle path,
data relating to a change in vehicle speed,
data relating to a change in acceleration,
data relating to state-of-charge (SOC) of the ESS,
data relating to determined voltages and current levels in any one of a bidirectional DC/AC converter or a DC/DC converter,
characteristics of the electric machine in at least one of the first vehicle or the second vehicle,
data relating to a weight of the first vehicle and the second vehicle, and/or
data indicating a type of vehicle combination.

7. The method of claim 1, wherein the transfer of electrical energy is performed by an inductive coupling between the first vehicle and the second vehicle.

8. The method of claim 1, wherein the transfer of electrical energy is performed by a conductive coupling between the first vehicle and the second vehicle.

9. A vehicle combination, comprising:
a first vehicle comprising:
an electric machine; and
an energy storage system (ESS);
a second vehicle electrically coupled to the first vehicle, the second vehicle comprising:
an electric machine operable in a traction mode and a generator mode for generating electrical energy during a regenerative braking event of the second vehicle;
an ESS; and
a control system comprising processing circuitry, the control system configured to:
determine an amount of possible excessive energy from a regenerative braking event of the second vehicle;
determine a total energy level of the second vehicle,
determine a total energy level of the first vehicle,
compare the determined amount of possible excessive energy with the determined total energy levels of the first vehicle and second vehicle, and
control direction of the transfer of electrical energy between the first vehicle and the second vehicle based on the comparison.

10. The vehicle combination of claim 9, wherein the first vehicle is an autonomous vehicle, such as an autonomous towing vehicle, an autonomous tractor of a truck, or an autonomous dolly vehicle.

11. The vehicle combination of claim 9, wherein the second vehicle is an autonomous dolly vehicle.

12. A vehicle for forming a vehicle combination with another vehicle, the vehicle comprising:
an electric machine operable in a traction mode and a generator mode for generating electrical energy during a regenerative braking event of the second vehicle;
an energy storage system (ESS); and
a control system comprising processing circuitry, the control system, when coupled to another vehicle, configured to:
determine an amount of possible excessive energy from a regenerative braking event of the vehicle;
determine a total energy level of the vehicle,
determine a total energy level of the another vehicle,
compare the determined amount of possible excessive energy with the determined total energy levels of the another vehicle and the vehicle, and
control direction of the transfer of electrical energy between the another vehicle and the vehicle based on the comparison.

* * * * *